May 22, 1923.

W. EDWARDS

PANORAMIC ATTACHMENT FOR CAMERAS

Filed Nov. 22, 1921  3 Sheets-Sheet 1

1,456,372

William Edwards
INVENTOR

BY Victor J. Evans
ATTORNEY

WITNESS:

May 22, 1923.

W. EDWARDS

PANORAMIC ATTACHMENT FOR CAMERAS

Filed Nov. 22, 1921     3 Sheets-Sheet 2

1,456,372

William Edwards
INVENTOR

BY Victor J. Evans
ATTORNEY

WITNESS:

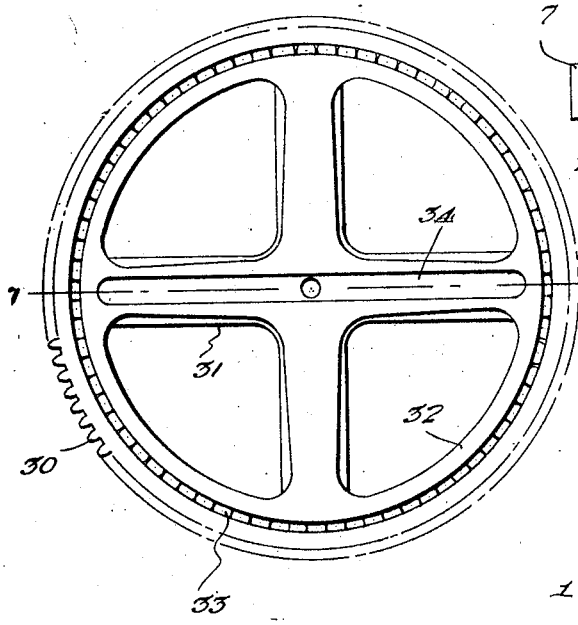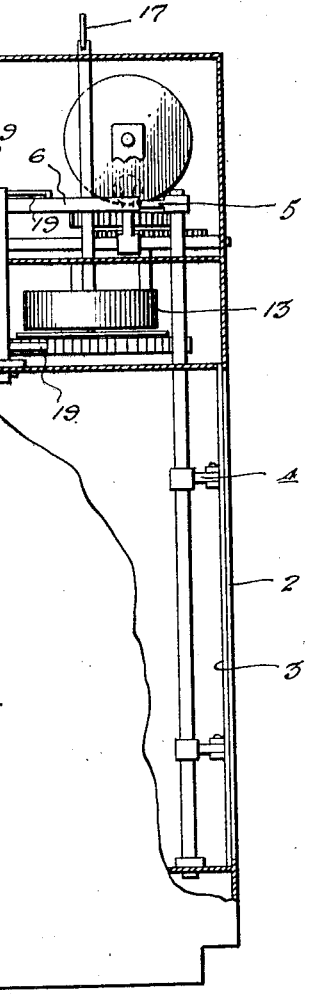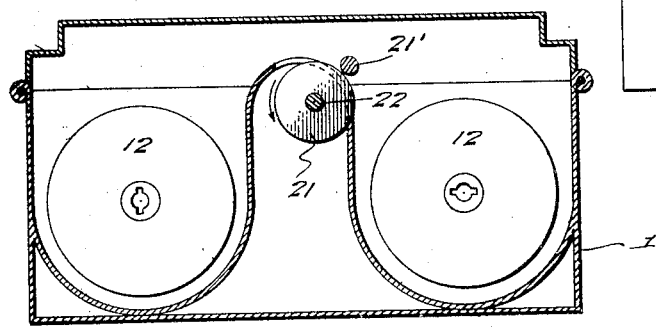

Patented May 22, 1923.

1,456,372

UNITED STATES PATENT OFFICE.

WILLIAM EDWARDS, OF ROCK SPRINGS, WYOMING.

PANORAMIC ATTACHMENT FOR CAMERAS.

Application filed November 22, 1921. Serial No. 516,981.

*To all whom it may concern:*

Be it known that I, WILLIAM EDWARDS, a citizen of the United States, residing at Rock Springs, in the county of Sweetwater and State of Wyoming, have invented new and useful Improvements in Panoramic Attachments for Cameras, of which the following is a specification.

This invention relates to a panorama attachment for cameras, the general object of the invention being to provide means whereby an ordinary camera can be used for taking panorama pictures.

Another object of the invention is to so form the parts that the attachment does not need a case to pack it in as it can be carried in the pocket and it is of light weight.

A further object of the invention is to make the attachment of such a form that it can be inserted in the back of the camera the same as a film pack.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 4 is a side view with part of the casing broken away.

Figure 5 is a section on line 5—5 of Figure 3.

Figure 6 is a plan view of the members on the tripod.

Figure 7 is a section line 7—7 of Figure 6.

Figure 1:
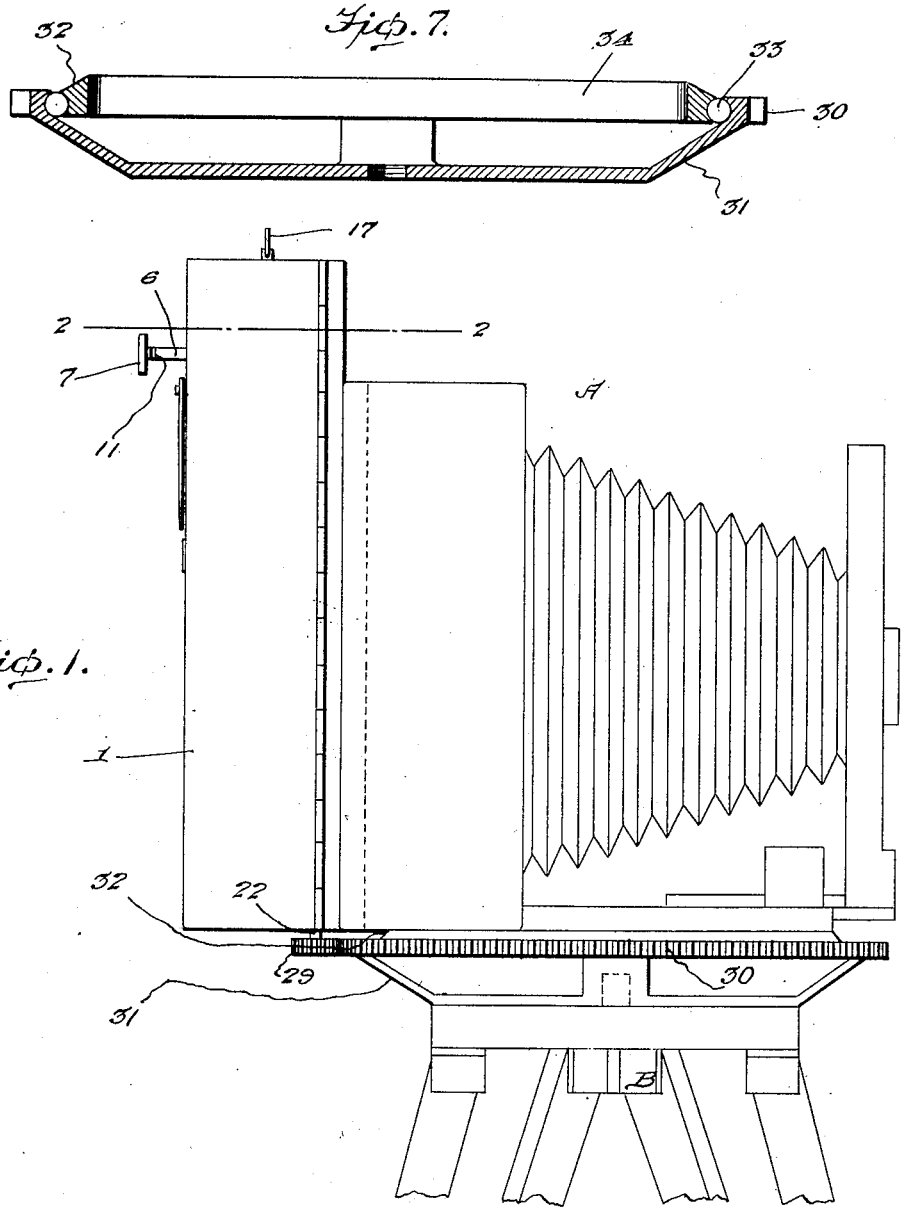
Figure 1 is a view showing a camera equipped with my invention.
Figure 2:
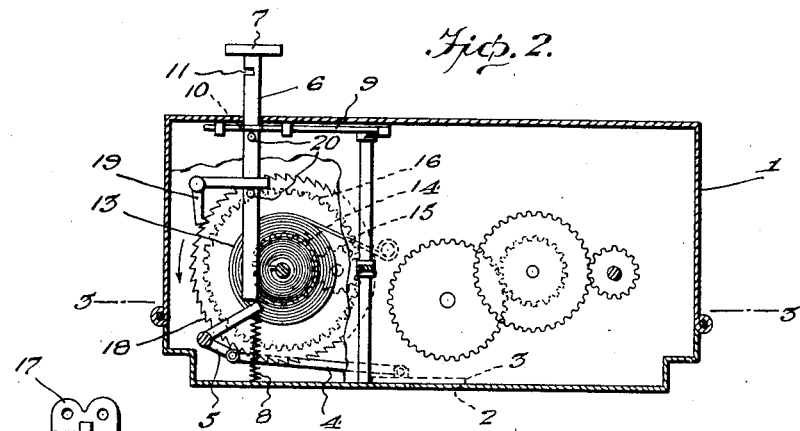
Figure 2 is a horizontal section on line 2—2 of Figure 1.
Figure 3:
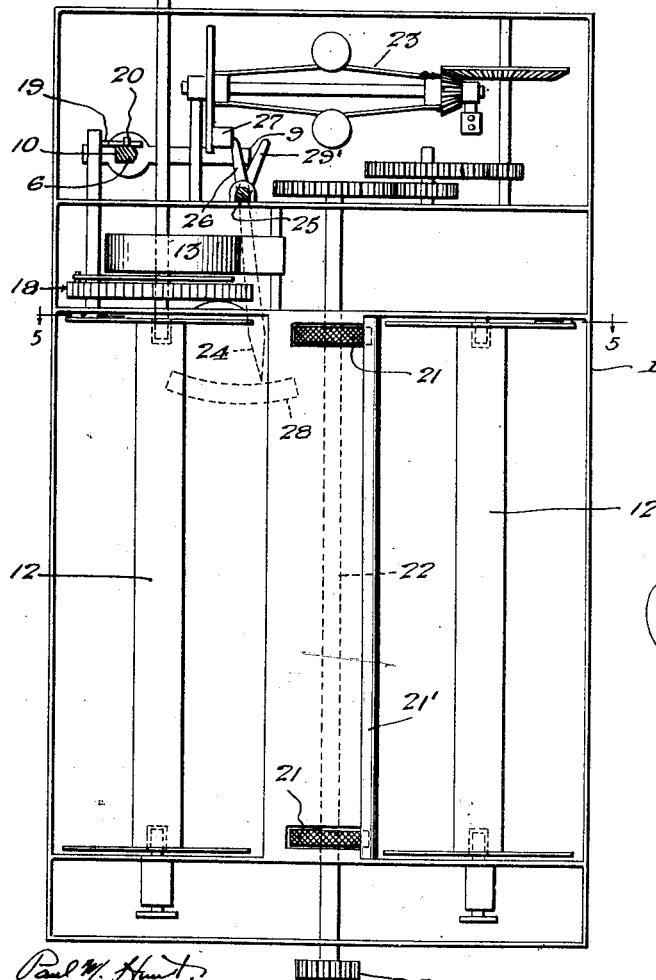
Figure 3 is a section on line 3—3 of Figure 2.
Figure 8:
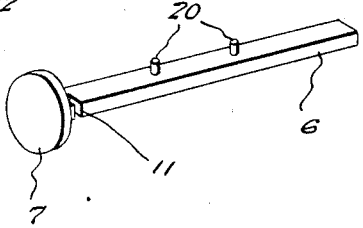
Figure 8 is a detail view of the push button and its stem.

The case of the attachment is shown at 1 and is so formed that it can be inserted in the back of the camera, shown at A, the same as a film pack. The front of the case is provided with a longitudinally extending opening 2 through which the rays of light passing through the lens of the camera are adapted to pass to strike the film. This opening is controlled by a sliding shutter 3 which is connected by a link 4 with the bell crank 5, said bell crank being rocked upon its pivot by the stem 6 of the push button 7. These parts are so arranged that when the button is pushed inwardly by the finger of the operator the shutter will be drawn from over the slot so as to permit the rays of light passing through the lenses to strike the film within the attachment. A spring 8 holds the parts with the shutter in closed position. The shutter is held in open position by means of a sliding bar 9 having an opening 10 therein through which the stem 6 passes and one wall of which is adapted to engage a notch 11 in the stem.

The film supporting spools 12 are removably and rotatably supported in the case 1 in the ordinary manner and the empty spool is connected with the spring motor 13 by the pinion 14, the idle gear 15 and the internal tooth gear 16. The spring motor being provided with a turning key 17 which extends through the top of the case. The internal gear is provided with ratchet teeth 18 which are engaged by a pawl 19 and this pawl is actuated by the stem 6 of the push button through the projections 20 on said stem, the parts being so arranged that when the push button is pressed inwardly to open the shutter the pawl is moved out of engagement with the ratchet teeth so as to permit the motor to turn the spool and thus wind a section of film from the full spool on to the empty spool.

The film passes over the discs 21, on shaft 22, in its passage from one spool to the other so that the movement of the film will be communicated to said shaft. The upper end of said shaft is geared to the governor 23, the speed of which is regulated by the indicator finger 24 secured to the projecting end of shaft 25 which carries the arm 26 to which the pad 27 is connected which bears against a disc of the governor. This finger operates over a dial 28 for setting the device to operate at the desired speed. Shaft 25 carries an arm 29' which is adapted to strike the member 9, when the finger 24 is at zero to move said member out of engagement with the stem 6 and thus permit the spring 8 to return the parts to normal position and close the shutter.

The lower end of shaft 22 carries a pinion 29 which engages an annular rack 30 on a member 31 which is adapted to be connected with a tripod B of the camera. This member 31 supports a ring member 32 by means of the balls 33, said member 32 being provided with a slot 34 to receive the thumb screw of the camera so that the camera can be adjustably secured to said ring member in order to place the pinion 29 in engagement with the annular rack 30.

After the attachment is put in place the speed indicator finger 24 is set for the required speed and then the button 7 pushed in. This will open the shutter and release the clock mechanism so that a section of film will be wound from the full spool onto the empty spool, the film passing over the slot 2 and thus will be exposed to the rays of light passing through the lenses. It is simply necessary to push the indicator finger back to zero to stop the operation and return the parts to normal position and close the shutter and also stop the motor.

The case 1 is formed of sections which are suitably connected together so as to allow for changing films.

The movement of the film will be communicated to shaft 22 and this shaft will actuate the governor and the pinion 29 engaging the rack 30 will cause the camera to rotate upon its tripod.

The film is pressed against the disc 21 by means of a spring pressed roller 21'.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A panorama attachment for a camera comprising a case, spool supporting means therein, a motor for rotating one spool, said casing having a shutter controlled opening therein for exposing the film to the rays of light passing through the lens of the camera, means for actuating the shutter and controlling the operation of the motor and means actuated by the movement of the film from one spool to the other for rotating the camera upon its tripod.

2. A panorama attachment for a camera comprising a casing, spool supporting means therein, a spring motor for rotating one spool, said casing having a shutter controlled opening therein for exposing the film to the rays of light passing through the lens of the camera, manually operated means for opening the shutter and causing the motor to actuate the spool, a governor for regulating the speed of the motor, manually operated means for regulating the governor and means actuated by the movement of the film for causing the camera to rotate on its tripod.

3. A panorama attachment for a camera comprising a casing, spool supporting means therein, a spring motor for rotating one spool, said casing having a shutter controlled opening therein for exposing the film to the rays of light passing through the lens of the camera, manually operated means for opening the shutter and causing the motor to actuate the spool, a governor for regulating the speed of the motor, manually operated means for regulating the governor, means actuated by the movement of the film for causing the camera to rotate on its tripod, such means including an annular rack carrying member adapted to be connected with the tripod, a gear connected with the attachment and engaging said rack and camera supporting means rotatably supported by the rack carrying member.

4. A panorama attachment for cameras comprising a case having a slot therein for exposing the film to the rays of light passing through the lens of the camera, spool supporting means in the case, a shutter for controlling the opening, a motor for rotating one spool, a governor for regulating the speed of the motor, manually operated means for opening the shutter and causing the motor to actuate the spool and an indicator for regulating the governor and associated with the manually operated means for returning the parts to inactive position when placed at zero.

5. A panorama attachment for cameras comprising a case having an exposure opening therein, a shutter controlling said opening, spool supporting means in the case, a motor for actuating one spool, manually operated means for actuating the shutter and for controlling the motor, a shaft, means for communicating the movement of the film thereto, a pinion on the shaft, a rack carrying member supported by the tripod of the camera and with the rack of which the pinion is adapted to engage, a rotatable member supported by the rack carrying member and means for adjustably connecting the camera therewith.

In testimony whereof I affix my signature.

WILLIAM EDWARDS.